US011546171B2

(12) United States Patent
Will et al.

(10) Patent No.: US 11,546,171 B2
(45) Date of Patent: Jan. 3, 2023

(54) SYSTEMS AND METHODS FOR SYNCHRONIZING ANONYMIZED LINKED DATA ACROSS MULTIPLE QUEUES FOR SECURE MULTIPARTY COMPUTATION

(71) Applicant: Acronis International GmbH, Schaffhausen (CH)

(72) Inventors: Mark A. Will, Singapore (SG); Sanjeev Solanki, Singapore (SG); Kailash Sivanesan, Singapore (SG); Serguei Beloussov, Costa Del Sol (SG); Stanislav Protasov, Moscow (RU)

(73) Assignee: Acronis International GmbH, Schaffhausen (CH)

( * ) Notice: Subject to any disclaimer, the term of this patent is extended or adjusted under 35 U.S.C. 154(b) by 160 days.

(21) Appl. No.: 16/875,037

(22) Filed: May 15, 2020

(65) Prior Publication Data
US 2021/0359862 A1 Nov. 18, 2021

(51) Int. Cl.
*H04L 9/32* (2006.01)
*G06F 21/50* (2013.01)
*G06F 16/178* (2019.01)
*H04L 12/18* (2006.01)
*H04L 67/55* (2022.01)
*G06F 21/62* (2013.01)

(52) U.S. Cl.
CPC ......... *H04L 9/3247* (2013.01); *G06F 16/178* (2019.01); *G06F 21/50* (2013.01); *H04L 12/1859* (2013.01); *H04L 67/55* (2022.05); *G06F 21/6254* (2013.01); *G06F 2221/034* (2013.01); *H04L 2209/46* (2013.01)

(58) Field of Classification Search
CPC ... H04L 9/3247; H04L 12/1859; H04L 67/26; H04L 2209/46; G06F 16/178; G06F 21/50; G06F 21/6254; G06F 2221/034
See application file for complete search history.

(56) References Cited

U.S. PATENT DOCUMENTS

| 2005/0210263 | A1* | 9/2005 | Levas | H04L 9/3271 713/182 |
| 2014/0237095 | A1* | 8/2014 | Bevilacqua-Linn | H04L 41/042 709/223 |
| 2015/0249603 | A1* | 9/2015 | Tompkins | H04L 47/34 370/392 |

(Continued)

*Primary Examiner* — Wasika Nipa
*Assistant Examiner* — Mayasa A. Shaawat
(74) *Attorney, Agent, or Firm* — ArentFox Schiff LLP; Michael Fainberg

(57) ABSTRACT

Disclosed herein are systems and methods for synchronizing anonymized linked data across multiple queues for SMPC. The systems and methods guarantee that data is kept private from a plurality of nodes, yet can still be synced within a local queue, across the plurality of local queues. In conventional SMPC frameworks, specialised data known as offline data is required to perform key operations, such as multiplication or comparisons. The generation of this offline data is computationally intensive, and thus adds significant overhead to any secure function. The disclosed system and methods aid in the operation of generating and storing offline data before it is required. Furthermore, the disclosed system and methods can help start functions across multi-parties, preventing concurrency issues, and align secure input data to prevent corruption.

22 Claims, 12 Drawing Sheets

(56) References Cited

U.S. PATENT DOCUMENTS

| | | | |
|---|---|---|---|
| 2016/0359636 A1* | 12/2016 | Kreft | H04L 9/0643 |
| 2017/0261592 A1* | 9/2017 | Min | G01S 5/0289 |
| 2019/0044711 A1* | 2/2019 | Roscoe | H04L 9/0844 |
| 2020/0021514 A1* | 1/2020 | Michael | H04L 45/121 |

* cited by examiner

SYSTEMS AND METHODS FOR SYNCHRONIZING ANONYMIZED LINKED DATA ACROSS MULTIPLE QUEUES FOR SECURE MULTIPARTY COMPUTATION

FIELD OF TECHNOLOGY

The present disclosure relates to the field of secure multiparty computation (SMPC), and, more specifically, to systems and methods for synchronizing anonymized linked data across multiple queues for SMPC.

BACKGROUND

Secure multiparty computation (SMPC) frameworks allow multiple parties to jointly compute a function, such that their inputs remain private. Data is protected by being split into secret shares, where each party receives a subset of these shares, therefore each party cannot see the real data. For example, 10 can be split into 3+2+5.

In conventional SMPC frameworks, specialised data known as offline data is required to perform key operations, such as multiplication or comparisons. The generation of this offline data is computationally intensive, and thus adds significant overhead to any secure function. With a system that allows arbitrary functions and data sizes, predicting the amount of required offline data is improbable. Secondly, when starting functions across multi-parties, concurrency issues can occur, causing deadlock of a system if functions are started in the wrong order across the parties or corruption if inputs are not synchronized.

SUMMARY

Aspects of the disclosure relate to the field of secure multiparty computation (SMPC). In particular, aspects of the disclosure describe methods and systems for synchronizing anonymized linked data across multiple queues for SMPC.

Linked data refers to data inputs related to one another where each data input is pushed by a respective party. The data inputs are not the same, but for another distributed system to process a respective data input properly, the linked data needs to be received by all the parties. For example, suppose that the value 10 is split into 3+2+5, and each value (3, 2 and 5) is pushed into separate queues (e.g., $Q_0$, $Q_1$, and $Q_2$), where $Q_0$ gets 3, $Q_1$ gets 2, and $Q_2$ gets 5. When popping from the queues, the party popping from $Q_0$ should get 3, the party popping from $Q_1$ gets 2, and the party popping from $Q_2$ gets 5. If the values are not received by each party in a synchronized manner (e.g., $Q_1$ returns 9), then the split value is no longer 10. Therefore, the values 3, 2 and 5 are known as linked data, as they are in different queues, but need to be popped at the same time.

In one exemplary aspect, a method may receive, at a node of a plurality of nodes, a push request comprising a push tag and a portion of the linked data. The method may store the portion of the linked data and the push tag in memory. The method may wait for multiple push requests, or may process one at a time. The method may transmit the push tag or tags to the remaining nodes, and may then receive a plurality of push tags from remaining nodes of the plurality of nodes. The method may determine whether the linked data will be synchronized when pushed into the plurality of queues by determining whether the push tag has been received by all nodes of the plurality of nodes based on the received plurality of push tags. In response to determining that the push tag has been received by all nodes of the plurality of nodes, the method may sort the plurality of push tags, and push the portion of the linked data to a queue of the plurality of queues based on the sorting.

In some aspects, subsequent to receiving the plurality of push tags from the remaining nodes of the plurality of nodes, the method may sort the push tag and the plurality of push tags and may compute a push digital signature of the sorted push tags. The method may transmit the push digital signature to the remaining nodes. The method may receive, from the remaining nodes, a plurality of push digital signatures and may determine whether the linked data will be synchronized when pushed into the plurality of queues (and also whether malicious tampering/an error has occurred) by determining whether the computed push digital signature matches each of the plurality of push digital signatures. In response to determining that the computed push digital signature does not match each of the plurality of push digital signatures, the method may output an error message, and in response to determining that the computed push digital signature matches each of the plurality of push digital signatures, the method may cache the push tag and the plurality of push tags.

In some aspects, in response to determining that the push tag has not been received by all the nodes of the plurality of nodes, the method may store the plurality of push tags in memory for a subsequent round.

In some aspects, the method may receive a pop request comprising a pop tag, and may transmit the pop tag to the remaining nodes. The method may receive a plurality of pop tags from the remaining nodes. The method may determine whether the linked data will be synchronized when popped from the plurality of queues by determining whether the pop tag has been received by all the nodes of the plurality of nodes based on the received plurality of pop tags. In response to determining that the pop tag has been received by all the nodes of the plurality of nodes, the method may sort the plurality of pop tags, pop the portion of the linked data from the queue of the plurality of queues based on the sorting of the plurality of pop tags, and output the linked data.

In some aspects, subsequent to receiving the plurality of pop tags from the remaining nodes of the plurality of nodes, the method may sort the pop tag and the plurality of pop tags. The method may compute a pop digital signature of the sorted pop tags, and may transmit the pop digital signature to the remaining nodes. The method may receive, from the remaining nodes, a plurality of pop digital signatures. The method may determine whether the linked data will be synchronized when popped from the plurality of queues by determining whether the computed pop digital signature matches each of the plurality of pop digital signatures. In response to determining that the computed pop digital signature does not match each of the plurality of pop digital signatures, the method may output an error message, and in response to determining that the computed pop digital signature matches each of the plurality of pop digital signatures, may cache the pop tag and the plurality of pop tags.

In some aspects, in response to determining that the pop tag has not been received by all the nodes of the plurality of nodes, the method may store the plurality of pop tags in the memory for the subsequent round.

In some aspects, in response to determining that the pop tag has not been received by all nodes of the plurality of nodes, the method may apply a unique sort to the plurality of pop tags to determine a sorted list, pop a respective portion of the linked data for each pop tag in the sorted list, and cache the pop tag and the respective portion of the linked data.

In some aspects, the method may determine that a number of nodes from the plurality of nodes have received the push tag, wherein the number is less than a total number of nodes in the plurality of nodes. In response to determining that the threshold number is greater than a threshold number of nodes, the method may determine whether a timeout period has elapsed, and in response to determining that the timeout period has elapsed, may transmit an empty tag to the remaining nodes of the plurality of nodes to proceed with the pushing process.

In some aspects, the method may receive a pop request comprising a pop tag, may check the cached popped data mapping for an existing entry. The method upon determining an entry exists may return the corresponding popped data for the requested pop tag, and may delete the pop tag from the cache.

In some aspects, the remaining portions of the linked data are not revealed to the node and the portion of the linked data received at the node are not revealed to the remaining nodes.

In some aspects, in response to determining that the push or pop digital signatures do not match each of the plurality of push or pop digital signatures, the method may detect tampering by a malicious entity, or that an error has occurred which would cause the queues to become unsynchronized.

In some aspects, the queue is a local queue in a local environment of the node, and each respective remaining queue of the plurality of queues is in a respective local environment of each respective remaining node of the plurality of nodes.

In some aspects, the portion of the linked data pushed into the queue is not transmitted to the remaining nodes.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for synchronizing anonymized linked data across multiple queues. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Queues (e.g., first-in-first-out (FIFO) queues) allow data to be pushed, where the first value into the queue, may be the first value out of the queue. In some aspects, a queue may also be last-in-first-out (LIFO) such that the most recent value into the queue is the first value out of the queue. Popping from a queue refers to removing the next element from the queue. Pushing to a queue refers to adding an element to the queue.

Figure 1:
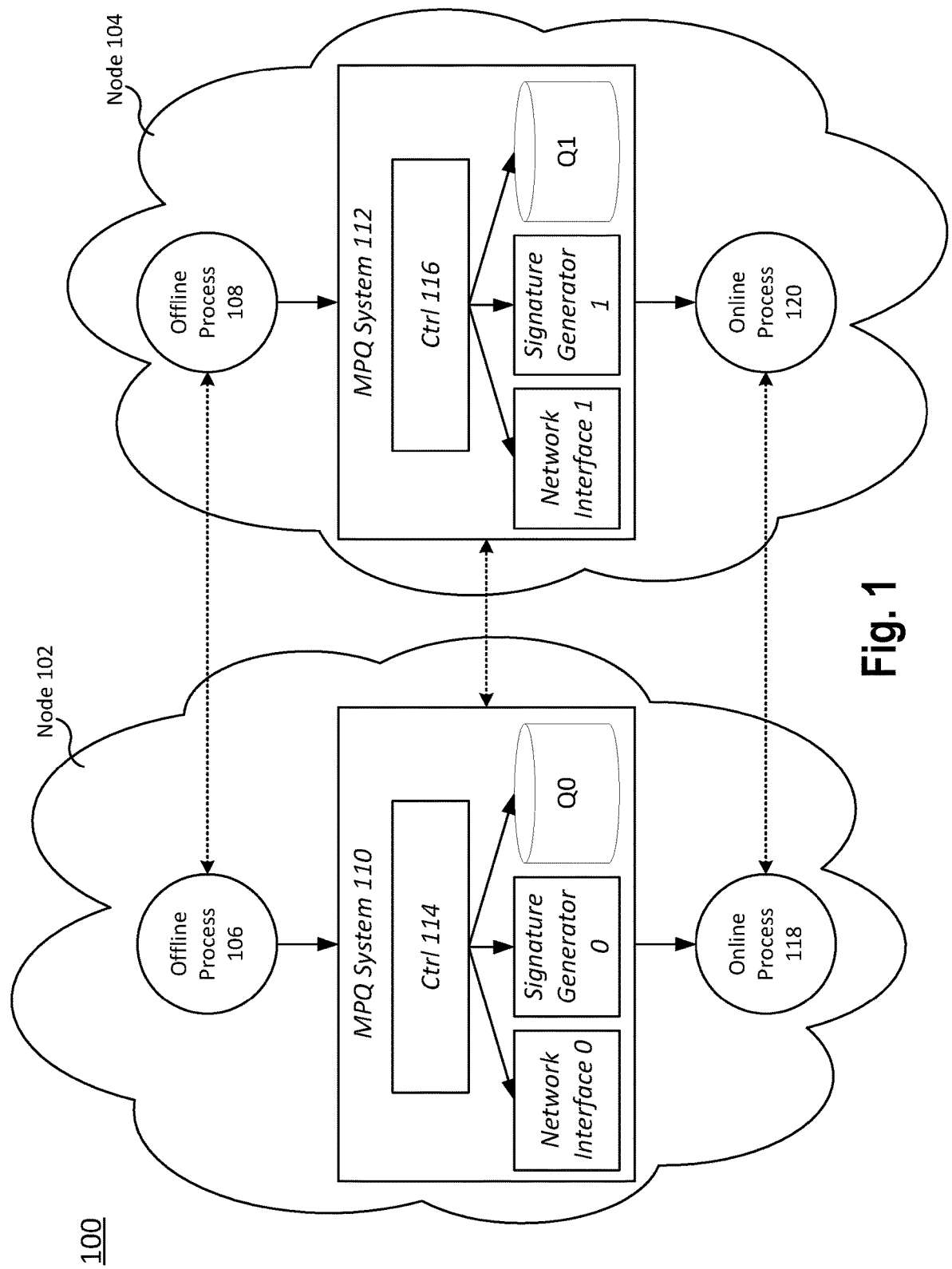
FIG. 1 is a block diagram illustrating a two-node Multiparty Queue (MPQ) system for synchronizing anonymized linked data across multiple queues for SMPC, in accordance with aspects of the present disclosure.

FIG. 1 is a block diagram 100 illustrating a two-node Multiparty Queue (MPQ) system for synchronizing anonymized linked data across multiple queues for a two-party SMPC network, in accordance with aspects of the present disclosure. In FIG. 1, nodes 102 and 104 represent independent parties (e.g., companies) that may wish to determine a result of an output, or compute the result for another entity. To achieve this, they both rely on a respective MPQ system (e.g., MPQ systems 110 and 112, respectively). An MPQ system allows multiple queues to be synced across parties without any sensitive or secret data being shared between the parties (unlike conventional distributed queue systems). This allows data to be pushed into the queues on each party (used interchangeably with node), where the synchronization will occur without any data being replicated (the data does not leave the party). There is no requirement for a master node and tampering and error detection are built in, which fully distributes the trust of the system evenly across all parties.

For SMPC offline data generation, each party can push their offline data shares in batches (>=1) (a single piece of offline data, e.g., a Beaver triple, would be of batch size 1) into the local queue, and the MPQ system will sync these pushes across all parties to ensure that no corruption will occur through misaligned elements in the queues (linked data). The benefit of this is that offline generation can occur at any time with multiple generators running, which can be offloaded to different resources. Consumption of this data will only occur when the SMPC online phase requires some offline data, where it can pop a batch from the queue. Likewise, the popping process is also synchronized across the parties to guarantee the same offline data is being used. Therefore, many online phases can be running in parallel, all popping from the same MPQ (or there could be different pools of online phases and MPQs). It should be noted that the online phase can either (1) pop a batch as required (to save memory), (2) pop a batch when the online process has or is close to running out of offline data, (3) pop the amount it will need for its entire computation, or (4) some combination of all three.

Offline data generators, represented as offline processes 106 and 108, are known as producers in a typical queue model, as they are pushing data into the queues. A job management framework may also be a producer, which would be responsible for starting functions, and may supply secret inputs or arguments to be used within the functions. Online workers, represented as online processes 118 and 120, are known as the consumers of the queue, and pop data from the queue.

FIG. 1 shows a model of an MPQ system using in a two-node setup, with one offline generator group (in this case a pair), and one online worker group. It should be noted that only two nodes/parties are shown for simplicity. One skilled in the art would appreciate that several nodes/parties may be required for obtaining the desired level of protection.

In FIG. 1, the SMPC offline processes 106 and 108 talk to each other to securely generate the offline shares. These offline shares are pushed into the MPQ systems 110 and 112, where both offline processes push to their local MPQ process, as the shares together form linked data. Each local MPQ process has a controller component Ctrl 114 and Ctrl 116, which each interact with network interfaces, signature generators, and queues. Their interaction is further discussed in FIGS. 2-9b.

Each MPQ system syncs the pushes before putting them into a respective queue, thus guaranteeing the queues ($Q_0$ and $Q_1$) are in the same order. The queue ($Q_0$ or $Q_1$) can either be persistent on disk, in memory, or both. An example of both is where there is a large persistent queue on disk, with smaller queue(s) in memory for faster pushing/popping.

The online processes 118 and 120 pop from the respective queues, where each online process calls the pop functionality of its local MPQ process. The MPQ systems will sync these pops across the nodes, before each local MPQ process sends the offline data to the online process.

The MPQ systems can be used in other use cases as well, such as synchronizing the starting of programs on different parties. If there is a limited number of working threads available (i.e. a pool of worker threads), deadlock is possible if one party of the plurality of parties is waiting for a program to start on another but there are no available workers. The MPQ will prevent this from happening, and keep any information that is locally secret from leaving the party, such as secret function arguments (arguments as secret shares). This works in the same manner as for offline data, except that the data being pushed into the MPQ system is a task or job. The online worker can then pop the job, and because the MPQ's order is synced, the same job will get popped and run on all parties, preventing deadlock. The workers can either then use a discovery service to locate the same job on the other parties, or for each party a worker is setup with the same worker ID (i.e. the pop tag) with predefined knowledge of the other workers, meaning that the MPQ system will give those workers the same job (online worker group).

There are various reasons why the MPQ system disclosed is superior to a conventional system. Firstly, for any conventional queue framework/system that requires a master node, the trust of the system is not fully distributed between the parties and is dependent on the master node. This is not suitable for SMPC systems. Secondly, if a queue system does not replicate or sync for every push straight away, it can add latency into the consumer systems as the consumer systems will need to wait for synchronization. For example, if a job is pushed into the queues, then the time it takes to sync can dramatically affect the overall computation time. The disclosed MPQ system can sync on every push request instantly to reduce the overhead it may be adding to the consumer system (e.g., a SMPC online worker). Lastly, for many conventional distributed queues, a push is done on one of the nodes and synced to the others nodes. This does not fit the SMPC model either, as each node needs to push data which should be kept private, and treated as one entry in the queues (linked data), even when it is pushed to each queue node.

Figure 2:
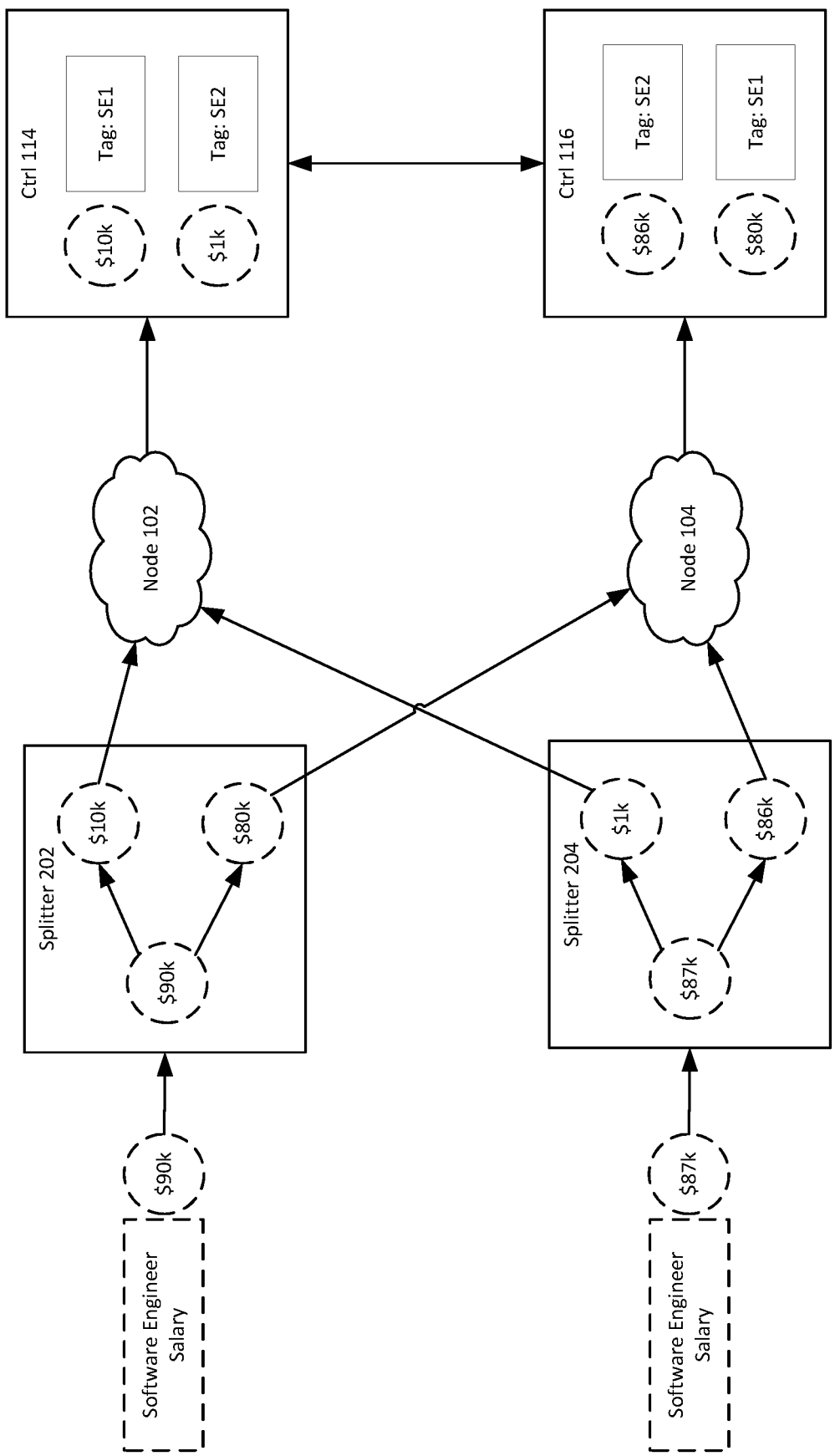
FIG. 2 is a block diagram illustrating clients uploading data for computation within SMPC, via an MPQ system, in accordance with aspects of the present disclosure.

FIG. 2 is a block diagram 200 illustrating clients uploading data for computation within SMPC, via an MPQ system, in accordance with aspects of the present disclosure. This is another example of a use case for MPQ, data input synchronization, but is an overly simplified example. Consider a scenario in which node 102 and node 104 represent software companies that want to determine the average salary for software engineers, including software engineers employed by other companies. In this example only two software engineers participate, with salaries $90k, and $87k. Thus, the average is $88.5k. However, the respective nodes may not want to reveal the salary information entered by the participants, and may simply wish to know what is the overall average. This may be, for example, because the individual companies wish to determine whether their salaries are competitive in the market.

Using SMPC principles, splitter 202 may split the data input into a number of portions (shares) equal to the number of nodes that are communicating with one another. Each splitter processes 202 and 204 may be on a respective participant device in the form of an application or website. In this example, because there are only two nodes, splitter processes 202 and 204, split their respective data inputs into two portions. For example, splitter 202 may split $90k into $10k and $80k. Likewise, splitter 204 may split $87k into $1k and $86k. The manner of the split is arbitrary as the goal is simply to prevent the other node from determining the original data input. One skilled in the art would appreciate that the splitting is more advanced in practice (e.g., may use multiplicative secret sharing, or use a polynomial equation to split the values). The splitter processes may further tag each of the portions of the respective inputs. In FIG. 2, the tag assigned to the split data inputs of splitter 202 is SE1 and the tag assigned to the split data inputs of splitter 204 is SE2. For FIG. 1, the offline processes 106 and 108 may generate the offline data in an already split format, and can automatically tag each push. For the offline processors, they may have a predefined starting push tag, or agree upon a tag. The offline processes may automatically increment the tag after each push.

Ctrl 114, which is a controller component of MPQ system 110, may then receive a push request comprising a push tag and a portion of the linked data. The controller components Ctrl 114 and Ctrl 116 in this case will process one request at a time. For example, ctrl 114 may receive the input $10k with tag SE1 from splitter 202. The push tags represent identifiers of all data inputs generated by a given producer. The push tag may be attached to the push request as a form of metadata. Although an example of "SE1" and "SE2" is given, one skilled in the art will appreciate that these values are only examples and can be any combination of bytes, characters and/or numbers, and can be generated or defined in a number of ways. Ctrl 114 may also receive a plurality of tags from each of the remaining nodes of the plurality of nodes. In this scenario, as there is only one other node, ctrl 114 will receive a tag from splitter 204 (e.g. via network interfaces 0 and 1 in FIG. 1). Ctrl 116 during this round receives a push request comprising the input $86k and tag SE2 from splitter 204. This is an example where data can become out of sync if both software engineers were submitting at the same time. Because Ctrl 114 has the tag SE1, and received the tag SE2 from Ctrl 116, the linked data is cached. Ctrl 114 will cache the linked data $10k, and Ctrl 116 will cache the linked data $86k. Additionally, both Ctrl 114 and Ctrl 116 keep record of the push tags the other received during previous rounds. The control processes then check the record of push tags to identify any push tags that have now been received by the plurality of nodes. At this stage, none of the tags meet this condition.

In this scenario, as there is only one other participant, ctrl 114 receives tag SE2 and the input $1k from splitter 204 during this round. While ctrl 114 receives this information, ctrl 116 may receive a push request comprising the input $80k and tag SE1 from splitter 202. The respective controller components transmit the received push tag, ctrl 114 transmits SE2 to ctrl 116, and ctrl 116 transmits SE1 to ctrl 114. Because the two tags differ, meaning that ctrl 114 and ctrl 116 did not receive the same push tag, the linked data is cached, and the record of push tags received is updated. The control processes then check the record of push tags to identify any push tags that have now been received by the plurality of nodes. Now both SE1 and SE2 have been received by the plurality of nodes.

It should be noted that if these four values are averaged, the result is also $88.5k. However, from the data inputs held by each node, the node cannot determine the average software engineer salary (i.e., node 104 cannot determine that the salary shares on node 102 are $10k and $1k).

Figure 3:
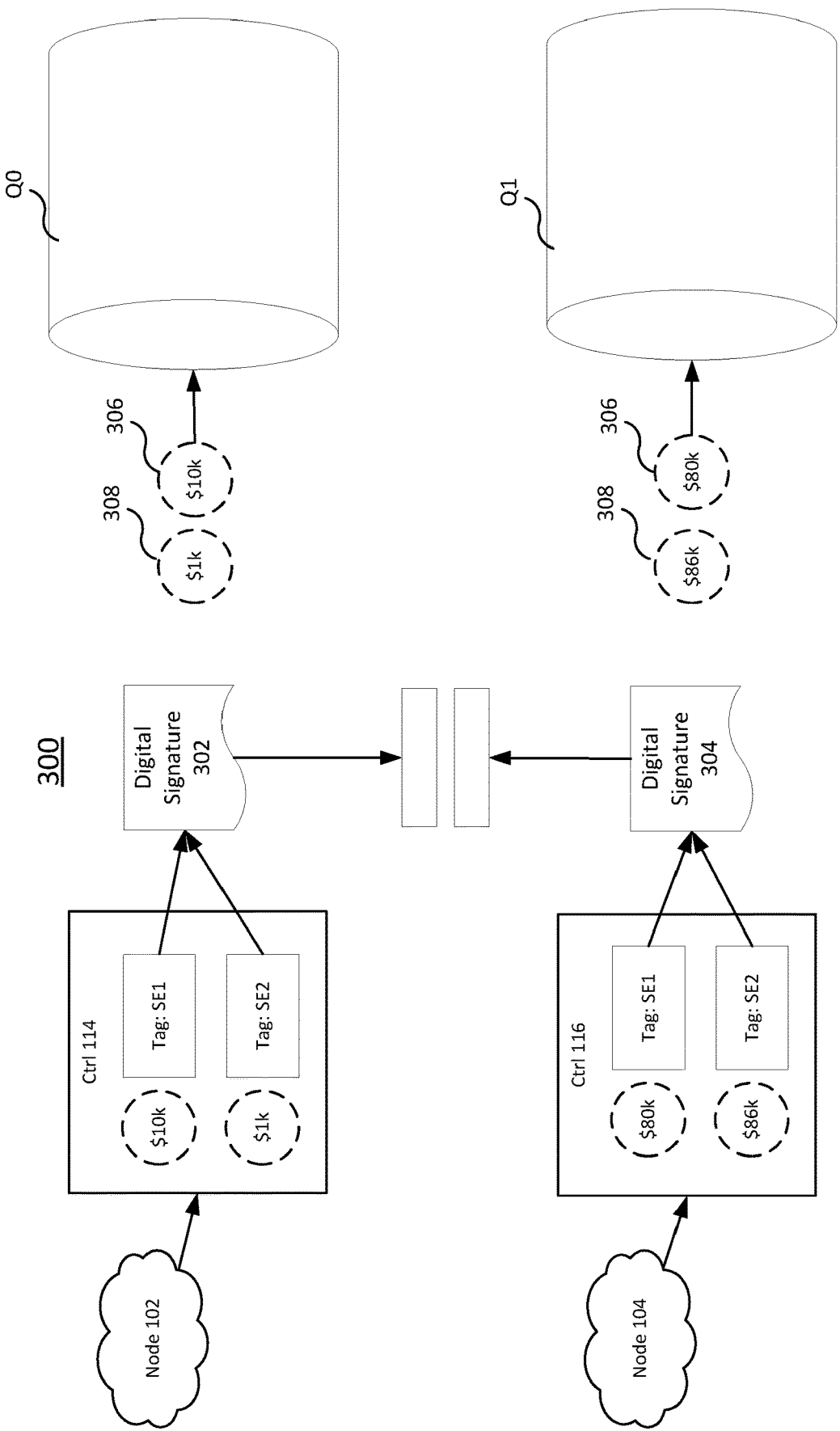
FIG. 3 is a block diagram illustrating synchronizing pushes into the multiple queues, in accordance with aspects of the present disclosure.

FIG. 3 is a block diagram 300 illustrating synchronizing pushes into the multiple queues, in accordance with aspects of the present disclosure. In FIG. 3, each controller component is shown to sort the push tags, now that both SE1 and SE2 have been received by the plurality of nodes. For example, ctrl 114 may create an order such that SE1 tag is placed first (inputs 306), followed by SE2 (inputs 308). When generating tags, offline processes 106 and 108 in FIG. 1, or splitters 202 and 204 in FIG. 2, may in some aspects, communicate a format for the tags, or be predefined. This enables the controller components to sort the tags alphabetically or numerically. The respective components of each node may communicate with each other via network interfaces 0 and 1, which are configured to receive and transmit information.

Ctrl 114 and ctrl 116 may each generate respective digital signatures based on the sorted push tags. The digital signatures 302 and 304 may be, for example, hash values that are generated using a hash function (e.g., MD5, SHA1, etc.) executed via signature generators 0 and 1, respectively. Ctrl 114 and ctrl 116 may communicate with each other via the network interfaces to coordinate which hash function to use, or it may be predefined. The controller components may then exchange the digital signatures and perform a comparison. For example, ctrl 114 may receive digital signature 304 from ctrl 116 via the network interfaces and verify if any malicious activity has taken place, or if any errors occurred. The type of malicious activity that may be detected is if one node sends different tags to the other nodes. In this example with just two nodes, this malicious activity cannot take place, but for a system with more nodes, this detection is needed.

The linked data will be synchronized when pushed into a plurality of queues by determining whether the computed push digital signature (i.e., digital signature 302) matches the received push digital signature (i.e., digital signature 304). In response to determining that the push digital signatures match, the controller components may push inputs 306 and 308 into the queues Q0 and Q1. Inputs 306 and 308 represent the partial data inputs from each node. Collectively, inputs 306 and 308 form the linked data that needs to be pushed and popped from the queues together to ensure that misalignment does not occur.

Figure 4:
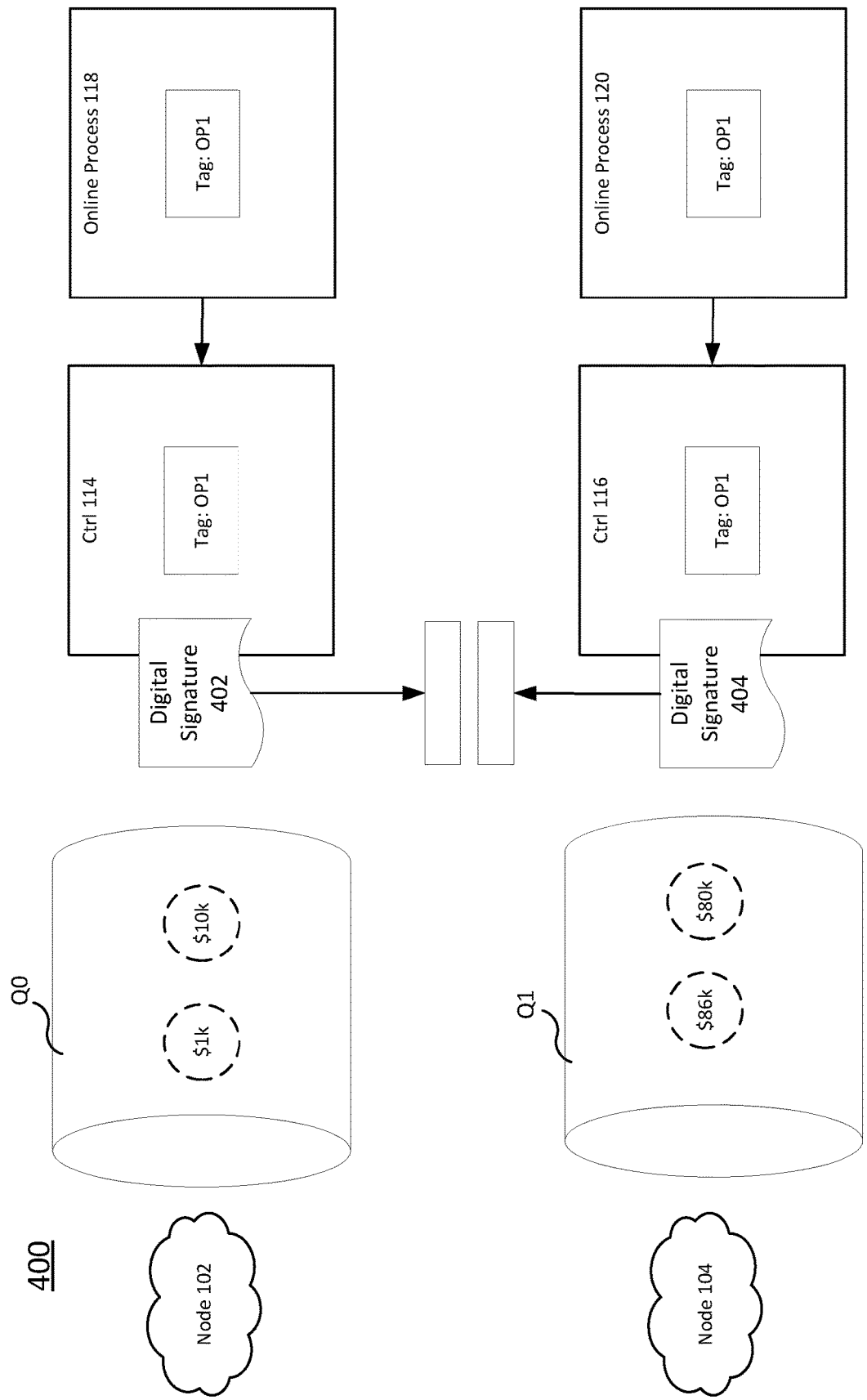
FIG. 4 is a block diagram illustrating synchronizing pops from the multiple queues, in accordance with aspects of the present disclosure.

FIG. 4 is a block diagram 400 illustrating synchronizing pops from the multiple queues, in accordance with aspects of the present disclosure. In FIG. 4, the queued linked data is ready to be popped from the respective local queues of nodes 102 and 104. As will be depicted in FIG. 7, popping needs to be synchronized as well. This is because there may be many consumers requesting to pop data at the same time, which makes it important that each group of consumers (one from each party) receives the correct data to keep the linked data intact. It should be noted that the linked data within the local queues is in the correct order, as the pushing method guarantees this.

Ctrl 114 may receive a pop request comprising a pop tag from online process 118, in this case OP1. Like a push tag, a pop tag represents an identifier that is attached to the pop request as a form of metadata to sync the requests across the plurality of nodes. In this example, the pop tags from online processes 118 and 120 need to be the same for the linked data to be correct. The pop tag can be either (1) agreed upon automatically between the online processes 118 and 120, (2) predefined during setup, or (3) specified by another process. Ctrl 114 and ctrl 116 may transmit their respective pop tags via network interfaces 0 and 1 to each other such that ctrl 114 receives OP1 and ctrl 116 receives OP1. Each controller component may again sort the pop tags (e.g., "OP1" followed by "OP1") and compute a pop digital signature of the sorted pop tag (e.g., "OP1OP1") via a signature generator.

Ctrl 114 and ctrl 116 may then exchange the determined digital signatures, namely, digital signature 402 and digital signature 404. Each controller component may verify whether the respective digital signatures match. In this case, the hash values determined by signature generators 0 and 1 will be the same because the sorted tag "OP1OP1" is shared amongst the two controller components. In response to determining that the digital signatures match, which further indicates that the pops of queue 0 and 1 will be synchronized, because both the pop tags are identical, ctrl 114 may pop input $10k from Q0. Likewise, ctrl 116 may pop input $80k from Q1. During another pop request where the above-identified conditions are met, ctrl 114 may pop $1k from Q0 and ctrl 116 may pop $86k from Q1.

Figure 5:
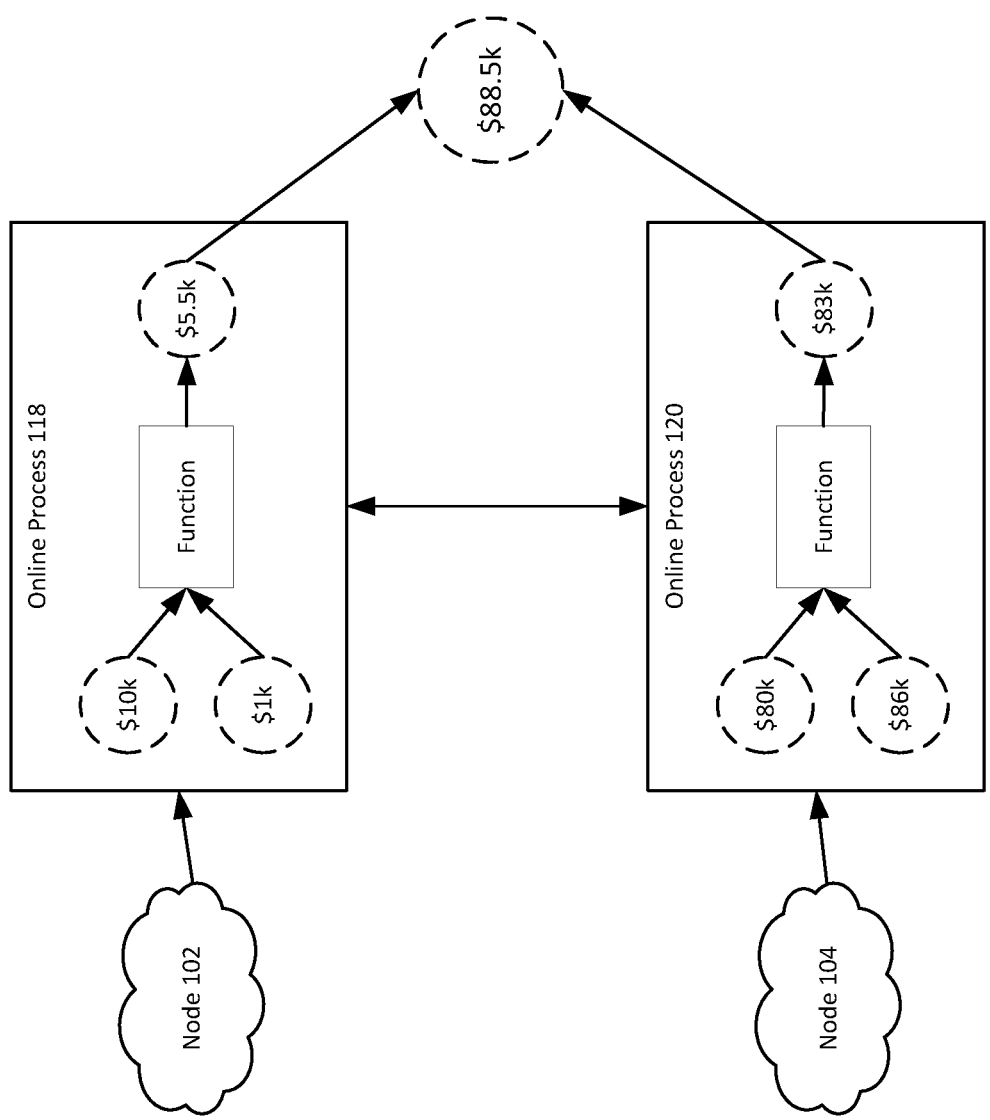
FIG. 5 is a block diagram illustrating online processes determining results of a secure function, in accordance with aspects of the present disclosure.

FIG. 5 is a block diagram 500 illustrating online processes determining results of a secure function, in accordance with aspects of the present disclosure. FIG. 5 continues the overarching example in which the respective online processes 118 and 120 receive the linked data (i.e., inputs 306 and 308). Each online process performs a function on the popped inputs. In this example, the function involves determining an average of the inputs. However, the function may be any mathematical function that transforms the inputs to generate an output. In some aspects, the online processes may communicate with each other to select the same function, or may communicate with each other to perform the function. In some aspects, the linked data may be split such that a first node is responsible for performing a given function and the second node is responsible for performing a different function. One skilled in the art will appreciate that these example functions are for simplicity, and that in practice more advanced functions and protocols may be used.

Online process 118 may determine that the average of $10k and $1k is $5.5k. Online process 120 may determine that the average of $80k and $86k is $83k. Online processes 118 and 120 may exchange these results (i.e., online process 118 may send $5.5k to online process 120, which returns $83k). The online processes may then combine (e.g., perform an addition function) the respective results to get the final result, $88.5k. Thus, both nodes are able to determine the average salary, without revealing any input salaries. Furthermore, the inputs traverse the MPQ system in a synchronous manner that ensures that inputs are not misaligned when they reach the online processes. In this example misalignment would only be a concern when using an advanced SMPC protocol for computing the function. However, this example would prevent an input not reaching node 102 or 104, which would in turn corrupt results.

Figure 6:
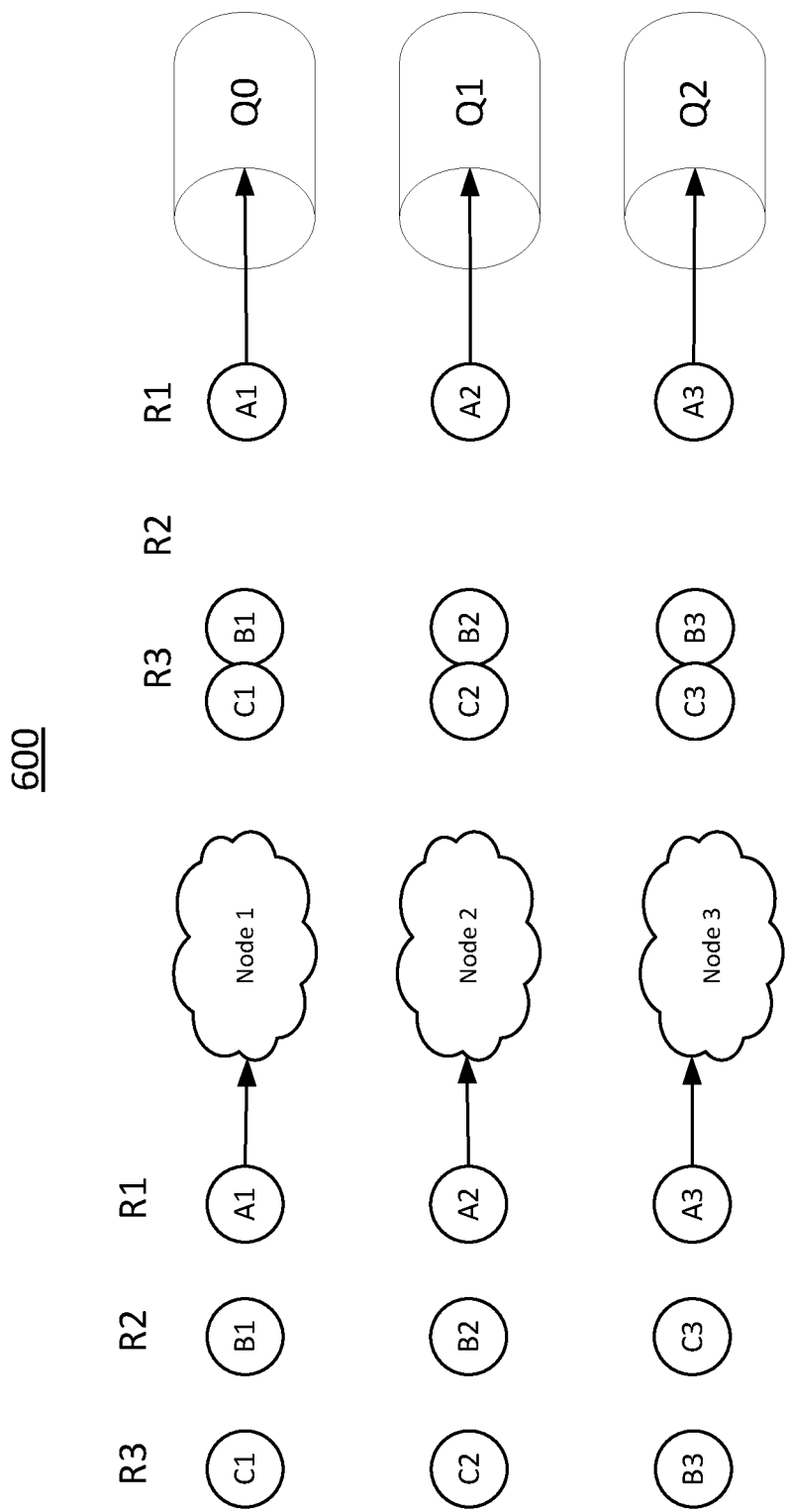
FIG. 6 is a diagram illustrating a scenario for pushing linked data into multiple queues, in accordance with aspects of the present disclosure.

FIG. 6 is a diagram 600 illustrating a scenario for pushing linked data into multiple queues, in accordance with aspects of the present disclosure. In FIG. 6, the network comprises three nodes: 1, 2, and 3. Each node comprises a respective queue of inputs: Q0, Q1, and Q2. For simplicity, suppose that all three queues are empty. Round 1 (i.e. R1 in FIG. 6) represents the portions of linked data marked by: A1, A2, and A3. For example, the offline processes of node 1, 2 and 3 may generate some offline data value A, which is represented as A1, A2 and A3 within its split format. The tags of the portions may be marked as "A". In order to successfully perform a push, all three tags need to be present for all three nodes. In round 1, because the digital signatures of the sorted tags will match, and the push tags received are all "A", the respective three inputs of the linked data are pushed into the local queues: Q0, Q1 and Q2, as shown by round 1 of the output having: A1, A2 and A3.

In round 2, the portions of a data input received by node 1 and node 2 are marked with tag "B", and represent the split value of B as B1, B2 and B3. However, node 3 has received the share C3 tagged as "C". Therefore, when the nodes transmit their tags to each other, both tags "B" and "C" have not been received by the plurality of nodes, thus the output of round 2 into the local queues is empty.

In round 3, the portions of data received by node 1 and node 2 are now tagged with "C", and node 3 has received the data and tag for "B". Now when the nodes transmit their tags to each other, both tags "B" and "C" have been received by the plurality of nodes. The tags "B" and "C" are sorted, a digital signature may be generated, and this digital signature may be transmitted to the remaining plurality of nodes. The nodes may receive the digital signatures from the other plurality of nodes. Upon confirming that the signatures match, the data for tags "B" and "C" can be pushed into the local queues, as shown by the output of round 3.

Figure 7:
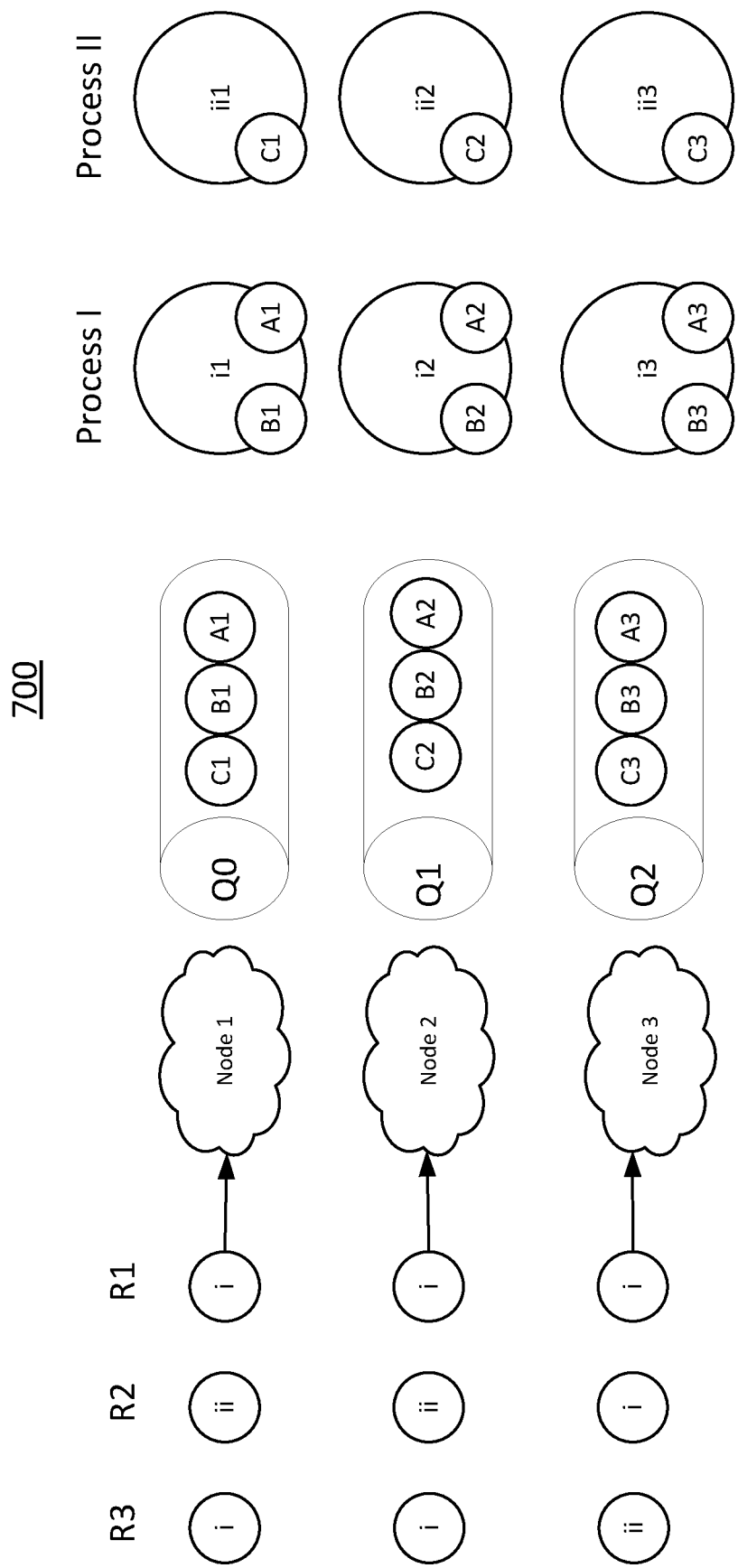
FIG. 7 is a diagram illustrating a scenario for popping linked data from multiple queues, in accordance with aspects of the present disclosure.

FIG. 7 is a diagram 700 illustrating a scenario for popping linked data from multiple queues, in accordance with aspects of the present disclosure. In FIG. 7, Q0, Q1 and Q2 (which correspond to node 1, node 2, and node 3 of FIG. 6) are popping data. Suppose that nodes 1, 2, and 3 are performing two secure functions, shown as processes I and II. Process I starts first and requires some offline data. The 3 subprocesses: i1, i2 and i3 which are running on node 1, node 2 and node 3 respectably, perform a pop request. This is shown as round 1 in FIG. 7. Because they are computing a function together, they use the same pop tag "i". Since the plurality of nodes each received the same tags, a data element can be popped from Q0, Q1 and Q2, which is represented by A1, A2 and A3. Processes i1, i2 and i3 each receive their share of the linked data.

Process II now requires offline data from the MPQ system, which has the 3 subprocesses: ii1, ii2 and ii3 which are running on node 1, node 2 and node 3 respectably. However, as the subprocesses send a pop request with the tag "ii", the subprocesses i1, i2, and i3 also send a pop request. In this example, only one pop request is processed at a time. Therefore, there is a possibility that the tags are received in different orders on nodes 1, node 2 and node 3. This can be seen during round 2 in FIG. 7, where node 1 and node 2 receive the tag "ii", but node 3 received the tag "i". The MPQ method in this example will transmit the tags to the other nodes, and receive the tags from the other nodes, then sort the pop tags, giving [i, ii, ii], before a digital signature check may take place. Because there was no tag received by the plurality of nodes, the pop tags are cached. The cache is checked for any tags that have been received by the plurality of nodes, which in this case, no tags are identified. Therefore, during round 2, both the subprocesses for Process I and II did not receive any offline data.

During round 3 in FIG. 7, node 1 and node 2 now receive the tag "i" while node 3 receives the tag "ii". The process follows what is described previously, but once the pop tags are cached, when the method checks for pop tags received by the plurality of nodes, both "i" and "ii" meet this condition. The pop tags are sorted, a digital signature check may occur (they can be configurable). First data will be popped from Q1, $Q_2$ and $Q_2$ for tag "i", then for tag "ii". The popped data is returned to the requestors for the tags. Thus, subprocesses i1, i2 and i3 get the popped data B1, B2 and B3 respectively, and the subprocesses ii1, ii2 and ii3 get the popped data C1, C2 and C3 respectively.

Figure 8A:
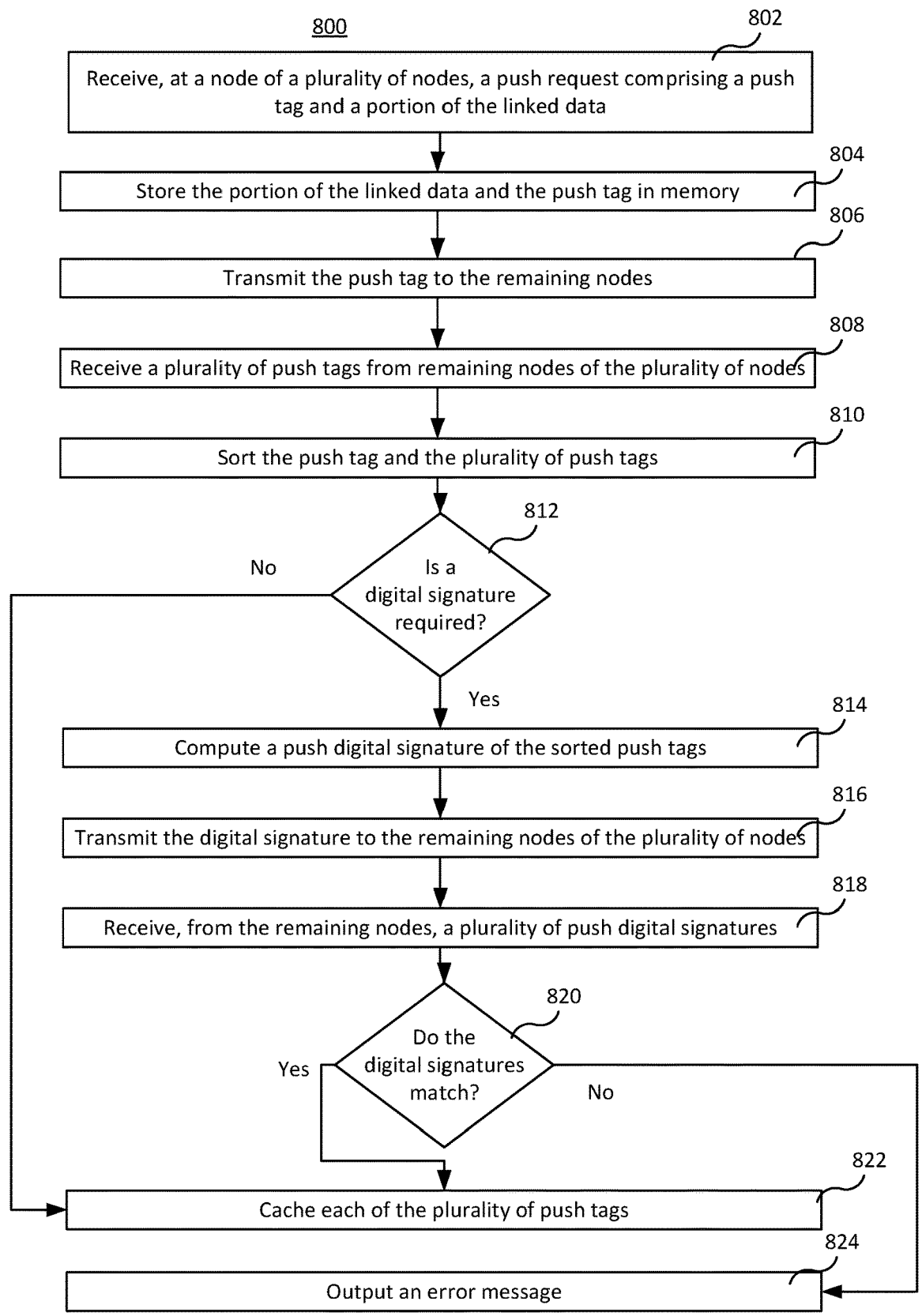
FIG. 8a illustrates a flow diagram of a method for caching push tags for synchronizing pushes of anonymized linked data into multiple queues, in accordance with aspects of the present disclosure.

FIG. 8a illustrates a flow diagram of a method 800 for caching push tags for synchronizing pushes of anonymized linked data into multiple queues, in accordance with aspects of the present disclosure. At 802, an MPQ system receives, at a node of a plurality of nodes, a push request comprising a push tag and a portion of the linked data. At 804, the MPQ system stores the portion of the linked data and the push tag in memory. At 806, the MPQ system transmits the push tag to the remaining nodes. At 808, the MPQ system receives a plurality of push tags from remaining nodes of the plurality of nodes. At 810, the MPQ system sorts the push tag and the plurality of push tags.

At 812, the MPQ system determines whether a digital signature is required. In response to determining that a digital signature is not required, method 800 advances to 822, where the MPQ systems caches each of the plurality of push tags. However, in response to determining that a digital signature is required, at 814, the MPQ system computes a push digital signature of the sorted push tags. At 816, the MPQ system transmits the digital signature to the remaining nodes of the plurality of nodes. At 818, the MPQ system receives, from the remaining nodes, a plurality of push digital signatures. At 820, the MPQ system determines whether the digital signatures match. In response to determining that the digital signatures match, at 822, the MPQ system caches each of the plurality of push tags. However, in response to determining that the digital signatures do not match, at 824, the MPQ systems outputs an error message.

Figure 8B:
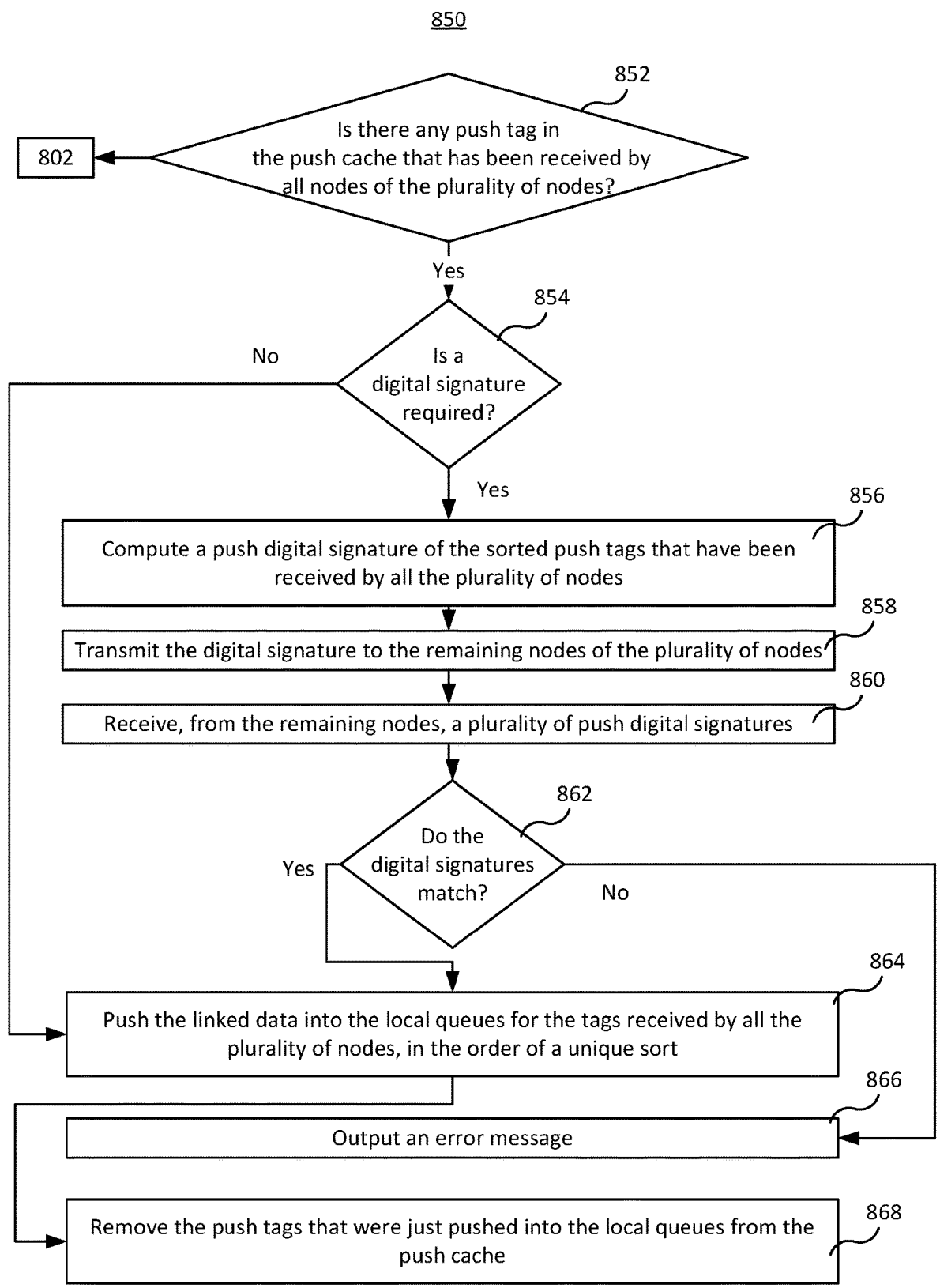
FIG. 8b illustrates a flow diagram of a method for synchronizing pushes of anonymized linked data into multiple queues, in accordance with aspects of the present disclosure.

FIG. 8b illustrates a flow diagram of method 850 for synchronizing pushes of anonymized linked data into multiple queues, in accordance with aspects of the present disclosure. It should be noted that method 850 occurs after method 800 has been completed at 822. Method 850 is not required if only one tag per node is processed per round, and all the tags received by the plurality of nodes are the identical.

At 852, the MPQ system determines whether there is any push tag in the push cache that has been received by all nodes of the plurality of nodes. In response to determining that there is not, method 850 returns to 802 of method 800. In response to determining that there is a push tag that has been received by all nodes, at 854, the MPQ system determines whether a digital signature is required. In response to determining that a digital signature is not required, method 850 advances to 864, where the MPQ systems pushes the linked data into the local queues for the tags received by all the plurality of nodes, in the order of a unique sort. However, in response to determining that a digital signature is required, at 856, the MPQ system computes a push digital signature of the sorted push tags that have been received by all the plurality of nodes. At 858, the MPQ system transmits the digital signature to the remaining nodes of the plurality of nodes. At 860, the MPQ system receives, from the remaining nodes, a plurality of push digital signatures. At 862, the MPQ system determines whether the digital signatures match. In response to determining that the digital signatures match, at 864, the MPQ system pushes the linked data into the local queues for the tags received by all the plurality of nodes, in the order of a unique sort. However, in response to determining that the digital signatures do not match, at 866, the MPQ systems outputs an error message. At 868, the MPQ system removes the push tags that were just pushed into the local queues from the push cache.

Figure 9A:
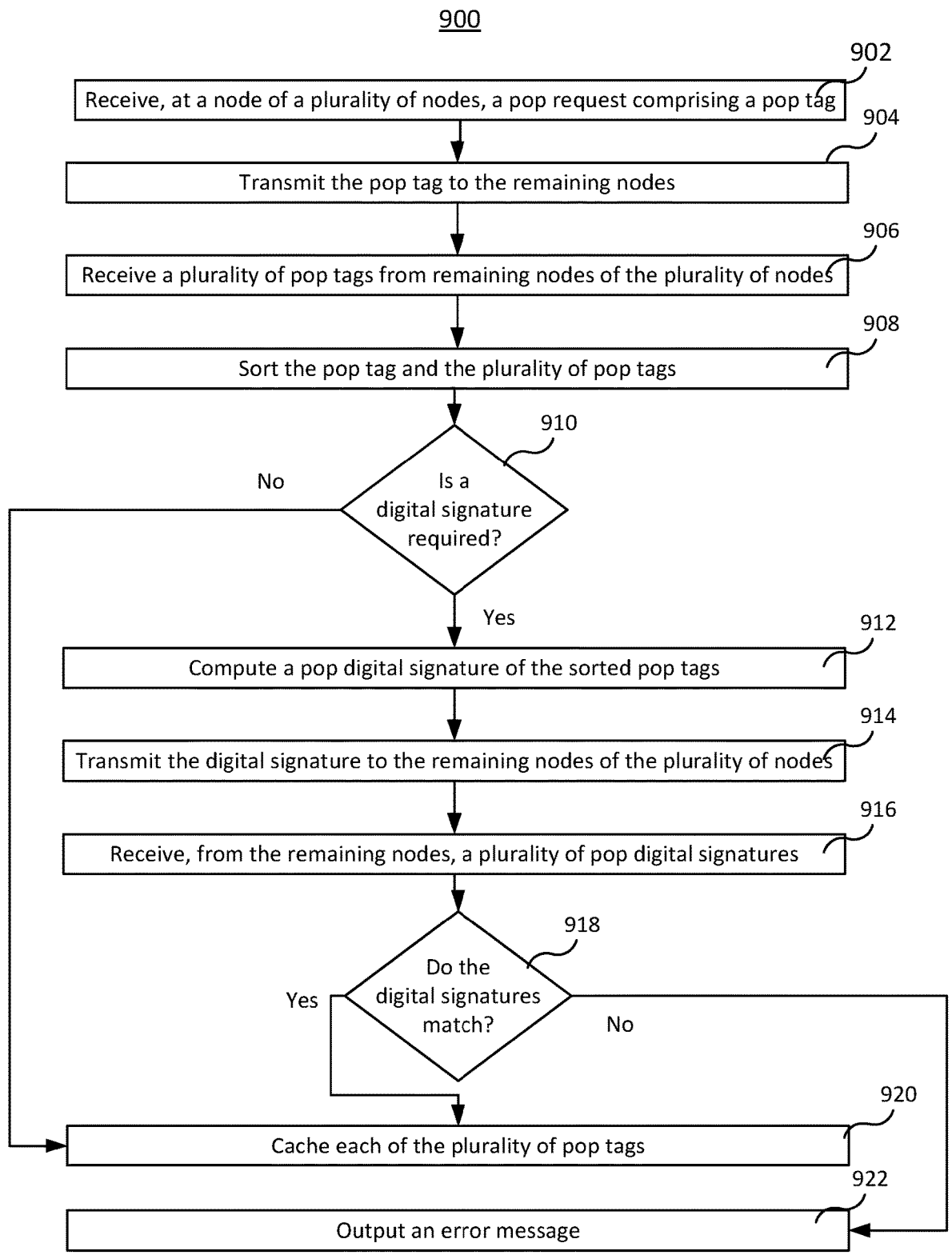
FIG. 9a illustrates a flow diagram of a method for caching pop tags for synchronizing pops of anonymized linked data from multiple queues, in accordance with aspects of the present disclosure.

FIG. 9a illustrates a flow diagram of a method 900 for caching pop tags for synchronizing pops of anonymized linked data from multiple queues, in accordance with aspects of the present disclosure. At 902, the MPQ system receives, at a node of a plurality of nodes, a pop request comprising a pop tag. At 904, the MPQ system transmits the pop tag to the remaining nodes. At 906, the MPQ system receives a plurality of pop tags from remaining nodes of the plurality of nodes. At 908, the MPQ system sorts the pop tag and the plurality of pop tags.

At 910, the MPQ system determines whether a digital signature is required. In response to determining that a digital signature is not required, method 900 advances to 922, where the MPQ systems caches each of the plurality of pop tags. However, in response to determining that a digital signature is required, at 912, the MPQ system computes a pop digital signature of the sorted pop tags. At 914, the MPQ system transmits the digital signature to the remaining nodes of the plurality of nodes. At 916, the MPQ system receives, from the remaining nodes, a plurality of pop digital signatures.

At 918, the MPQ system determines whether the digital signatures match. In response to determining that the digital signatures match, at 920, the MPQ system caches each of the plurality of pop tags. However, in response to determining that the digital signatures do not match, at 922, the MPQ systems outputs an error message.

Figure 9B:
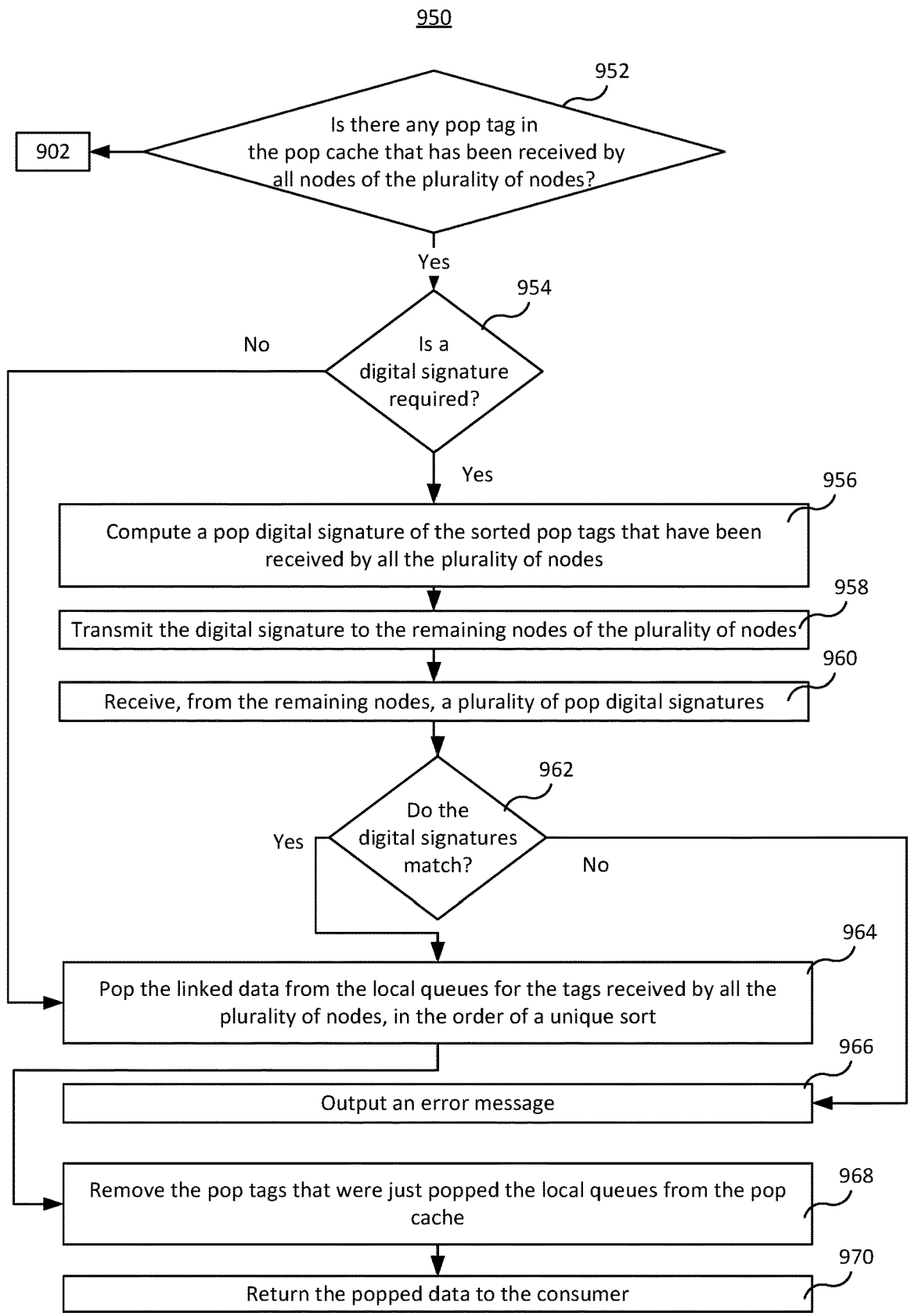
FIG. 9b illustrates a flow diagram of a method for synchronizing pops of anonymized linked data from multiple queues, in accordance with aspects of the present disclosure.

FIG. 9b illustrates a flow diagram of method 950 for synchronizing pops of anonymized linked data into multiple queues, in accordance with aspects of the present disclosure. It should be noted that method 950 occurs after method 900 has been completed at 920. Method 950 is not required if only one tag per node is processed per round, and all the tags received by the plurality of nodes are the identical.

At 952, the MPQ system determines whether there is any pop tag in the pop cache that has been received by all nodes of the plurality of nodes. In response to determining that there is not, method 950 returns to 902 of method 900. In response to determining that there is a pop tag that has been received by all nodes, at 954, the MPQ system determines whether a digital signature is required. In response to determining that a digital signature is not required, method 950 advances to 964, where the MPQ systems pops the linked data from the local queues for the tags received by all the plurality of nodes, in the order of a unique sort. However, in response to determining that a digital signature is required, at 956, the MPQ system computes a pop digital signature of the sorted pop tags that have been received by all the plurality of nodes.

At 958, the MPQ system transmits the digital signature to the remaining nodes of the plurality of nodes. At 960, the MPQ system receives, from the remaining nodes, a plurality of pop digital signatures. At 962, the MPQ system determines whether the digital signatures match. In response to determining that the digital signatures match, at 964, the MPQ system pops the linked data from the local queues for the tags received by all the plurality of nodes, in the order of a unique sort. However, in response to determining that the digital signatures do not match, at 966, the MPQ systems outputs an error message. At 968, the MPQ system removes the pop tags that were just popped from the local queues from the pop cache. At 970, the MPQ system returns the popped data to the consumer.

Figure 10:
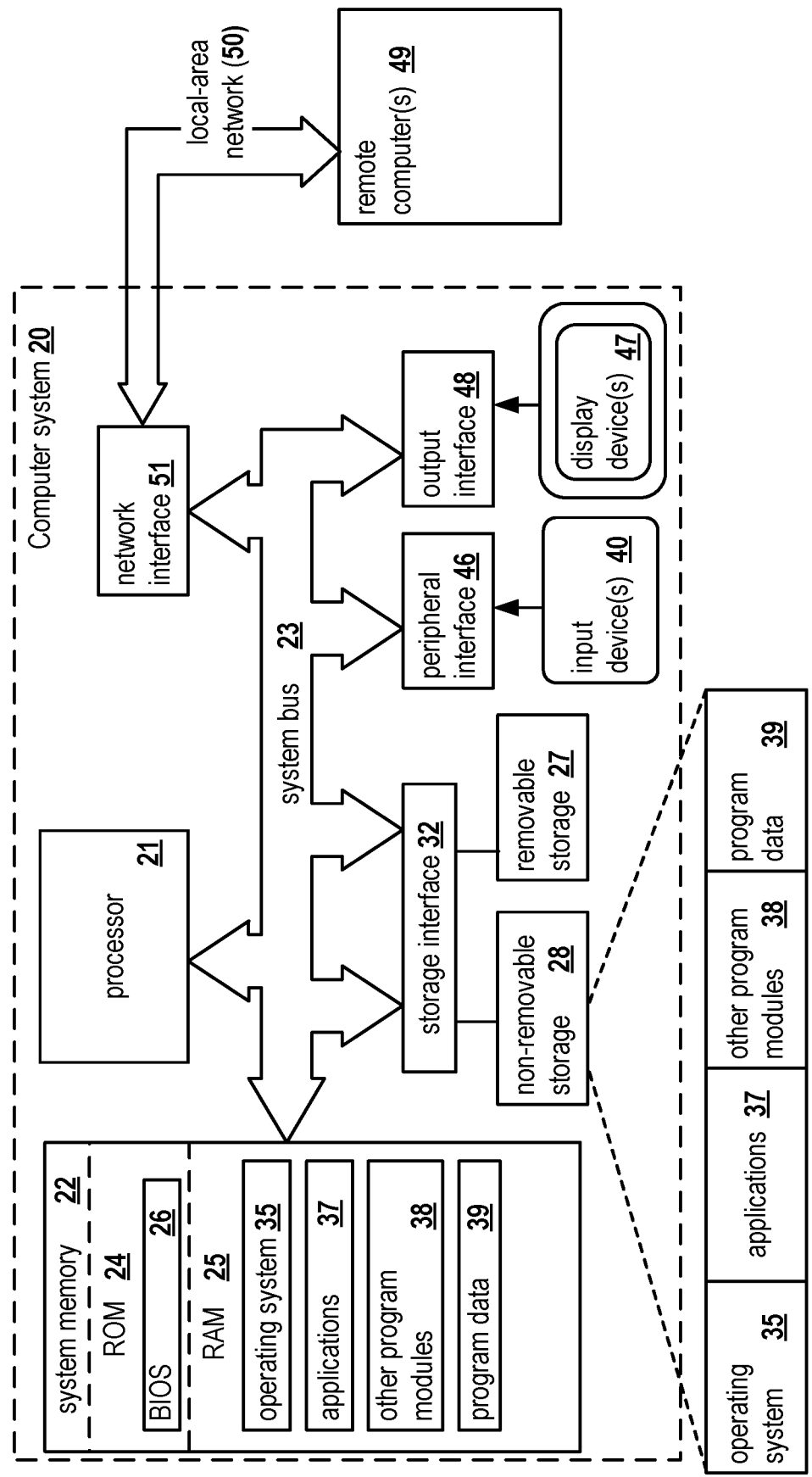
FIG. 10 presents an example of a general-purpose computer system on which aspects of the present disclosure can be implemented.

FIG. 10 is a block diagram illustrating a computer system 20 on which aspects of systems and methods for synchronizing anonymized linked data across multiple queues may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-9b may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for synchronizing anonymized linked data across multiple queues for secure multiparty computation (SMPC), the method comprising:
receiving, at a node of a plurality of nodes, a push request comprising a push tag and a portion of the linked data; storing the portion of the linked data and the push tag in memory;
transmitting the push tag to the remaining nodes;
receiving a plurality of push tags from remaining nodes of the plurality of nodes;
sorting the push tag and the plurality of received push tags;
computing a push digital signature of the sorted push tags;
transmitting the push digital signature to the remaining nodes;
receiving, from the remaining nodes, a plurality of push digital signatures;
determining whether the linked data will be synchronized when pushed into the plurality of queues by determining whether the computed push digital signature matches each of the plurality of push digital signatures; and
in response to determining that the linked data will be synchronized when pushed into the plurality of queues, pushing the portion of the linked data to a queue of the plurality of queues based on the sorting of the push tag and the plurality of received push tags.

2. The method of claim 1, further comprising:
in response to determining that the computed push digital signature does not match each of the plurality of push digital signatures, outputting an error message; and
in response to determining that the computed push digital signature matches each of the plurality of push digital signatures, caching the push tag and the plurality of push tags.

3. The method of claim 1, further comprising in response to determining that the push tag has not been received by all the nodes of the plurality of nodes, storing the plurality of push tags in memory for a subsequent round.

4. The method of claim 1, further comprising:
receiving a pop request comprising a pop tag;
transmitting the pop tag to the remaining nodes;
receiving a plurality of pop tags from the remaining nodes;
determining whether the linked data will be synchronized when popped from the plurality of queues by determining whether the pop tag has been received by all the nodes of the plurality of nodes based on the received plurality of pop tags;
in response to determining that the pop tag has been received by all the nodes of the plurality of nodes:
sorting the plurality of pop tags;
popping the portion of the linked data from the queue of the plurality of queues based on the sorting of the plurality of pop tags; and
outputting the linked data.

5. The method of claim 4, further comprising:
subsequent to receiving the plurality of pop tags from the remaining nodes of the plurality of nodes, sorting the pop tag and the plurality of pop tags;
computing a pop digital signature of the sorted pop tags;
transmitting the pop digital signature to the remaining nodes;
receiving, from the remaining nodes, a plurality of pop digital signatures;
determining whether the linked data will be synchronized when popped from the plurality of queues by determining whether the computed pop digital signature matches each of the plurality of pop digital signatures;
in response to determining that the computed pop digital signature does not match each of the plurality of pop digital signatures, outputting an error message; and in response to determining that the computed pop digital signature matches each of the plurality of pop digital signatures, caching the pop tag and the plurality of pop tags.

6. The method of claim 4, further comprising in response to determining that the pop tag has not been received by all the nodes of the plurality of nodes, storing the plurality of pop tags in the memory for the subsequent round.

7. The method of claim 4, further comprising:
in response to determining that the pop tag has not been received by all nodes of the plurality of nodes:
applying a unique sort to the plurality of pop tags to determine a sorted list;
popping a respective portion of the linked data for each pop tag in the sorted list; and
caching the pop tag and the respective portion of the linked data.

8. The method of claim 5, further comprising:
receiving another pop request comprising the pop tag;
in response to determining that the pop tag exists in a cache, returning the portion of the linked data and deleting the pop tag from the cache.

9. The method of claim 1, wherein remaining portions of the linked data are not revealed to the node and the portion of the linked data received at the node are not revealed to the remaining nodes.

10. The method of claim 1, further comprising in response to determining that the push digital signature does not match each of the plurality of push digital signatures, detecting at least one of tampering by a malicious entity or processing errors.

11. The method of claim 1, wherein the queue is a local queue in a local environment of the node, and wherein each respective remaining queue of the plurality of queues is in a respective local environment of each respective remaining node of the plurality of nodes.

12. The method of claim 1, further comprising:
determining that a number of nodes from the plurality of nodes have received a push or pop tag, wherein the number is less than a total number of nodes in the plurality of nodes;
in response to determining that the number is greater than a threshold number of nodes, determining whether a timeout period has elapsed; and
in response to determining that the timeout period has elapsed, transmitting an empty tag to the remaining nodes of the plurality of nodes to proceed.

13. The method of claim 1, wherein the portion of the linked data pushed into the queue is not transmitted to the remaining nodes.

14. A system for synchronizing anonymized linked data across multiple queues for secure multiparty computation (SMPC), the system comprising:
a hardware processor configured to:
receive, at a node of a plurality of nodes, a push request comprising a push tag and a portion of the linked data;
store the portion of the linked data and the push tag in memory;
transmit the push tag to the remaining nodes;
receive a plurality of push tags from remaining nodes of the plurality of nodes;
sort the push tag and the plurality of received push tags;
compute a push digital signature of the sorted push tags;
transmit the push digital signature to the remaining nodes;
receive, from the remaining nodes, a plurality of push digital signatures;
determine whether the linked data will be synchronized when pushed into the plurality of queues by determining whether the computed push digital signature matches each of the plurality of push digital signatures; and
in response to determining that the linked data will be synchronized when pushed into the plurality of queues,
push the portion of the linked data to a queue of the plurality of queues based on the sorting of the push tag and the plurality of received push tags.

15. The system of claim 14, wherein the hardware processor is further configured to:
in response to determining that the computed push digital signature does not match each of the plurality of push digital signatures, output an error message; and
in response to determining that the computed push digital signature matches each of the plurality of push digital signatures, cache the push tag and the plurality of push tags.

16. The system of claim 14, further comprising in response to determining that the push tag has not been received by all the nodes of the plurality of nodes, the hardware processor is further configured to store the plurality of push tags in memory for a subsequent round.

17. The system of claim 14, wherein the hardware processor is further configured to:
receive a pop request comprising a pop tag;
transmit the pop tag to the remaining nodes;
receive a plurality of pop tags from the remaining nodes;
determine whether the linked data will be synchronized when popped from the plurality of queues by determining whether the pop tag has been received by all the nodes of the plurality of nodes based on the received plurality of pop tags;
in response to determining that the pop tag has been received by all the nodes of the plurality of nodes:
sort the plurality of pop tags;
pop the portion of the linked data from the queue of the plurality of queues based on the sorting of the plurality of pop tags; and
output the linked data.

18. The system of claim 17, wherein the hardware processor is further configured to:
subsequent to receiving the plurality of pop tags from the remaining nodes of the plurality of nodes, sort the pop tag and the plurality of pop tags;
compute a pop digital signature of the sorted pop tags;
transmit the pop digital signature to the remaining nodes;
receive, from the remaining nodes, a plurality of pop digital signatures;
determine whether the linked data will be synchronized when popped from the plurality of queues by determining whether the computed pop digital signature matches each of the plurality of pop digital signatures;
in response to determining that the computed pop digital signature does not match each of the plurality of pop digital signatures, output an error message; and
in response to determining that the computed pop digital signature matches each of the plurality of pop digital signatures, cache the pop tag and the plurality of pop tags.

19. The system of claim 17, further comprising in response to determining that the pop tag has not been received by all the nodes of the plurality of nodes, the hardware processor is further configured to store the plurality of pop tags in the memory for the subsequent round.

20. The system of claim 17, wherein the hardware processor is further configured to:
in response to determining that the pop tag has not been received by all nodes of the plurality of nodes:
apply a unique sort to the plurality of pop tags to determine a sorted list;
pop a respective portion of the linked data for each pop tag in the sorted list; and
cache the pop tag and the respective portion of the linked data.

21. The system of claim 18, wherein the hardware processor is further configured to:
receive another pop request comprising the pop tag;
in response to determining that the pop tag exists in a cache, return the portion of the linked data and delete the pop tag from the cache.

22. A non-transitory computer readable medium storing thereon computer executable instructions for synchronizing anonymized linked data across multiple queues for secure multiparty computation (SMPC), comprising instructions for:
receiving, at a node of a plurality of nodes, a push request comprising a push tag and a portion of the linked data;
storing the portion of the linked data and the push tag in memory;
transmitting the push tag to the remaining nodes;
receiving a plurality of push tags from remaining nodes of the plurality of nodes;
sorting the push tag and the plurality of received push tags;
computing a push digital signature of the sorted push tags;
transmitting the push digital signature to the remaining nodes;
receiving, from the remaining nodes, a plurality of push digital signatures;
determining whether the linked data will be synchronized when pushed into the plurality of queues by determining whether the computed push digital signature matches each of the plurality of push digital signatures; and
in response to determining that the linked data will be synchronized when pushed into the plurality of queues,
pushing the portion of the linked data to a queue of the plurality of queues based on the sorting of the push tag and the plurality of received push tags.

* * * * *